(12) United States Patent
Berne et al.

(10) Patent No.: US 12,043,304 B2
(45) Date of Patent: Jul. 23, 2024

(54) VEHICLE COMPRISING A TRAILER ANGLE DETERMINING SYSTEM

(71) Applicant: Volvo Truck Corporation, Gothenburg (SE)

(72) Inventors: Nicolas Berne, Heyrieux (FR); Olivier Hermann, Saint-Maurice-sur-Dargoire (FR)

(73) Assignee: Volvo Truck Corporation, Gothenburg (SE)

( * ) Notice: Subject to any disclaimer, the term of this patent is extended or adjusted under 35 U.S.C. 154(b) by 339 days.

(21) Appl. No.: 17/433,328

(22) PCT Filed: Mar. 25, 2019

(86) PCT No.: PCT/EP2019/057448
§ 371 (c)(1),
(2) Date: Aug. 24, 2021

(87) PCT Pub. No.: WO2020/192886
PCT Pub. Date: Oct. 1, 2020

(65) Prior Publication Data
US 2022/0153345 A1 May 19, 2022

(51) Int. Cl.
*B62D 13/06* (2006.01)
*B60R 1/26* (2022.01)
(Continued)

(52) U.S. Cl.
CPC .............. *B62D 15/021* (2013.01); *B60R 1/26* (2022.01); *B62D 13/06* (2013.01);
(Continued)

(58) Field of Classification Search
CPC ....... B60R 2300/103; B60R 1/26; B60R 9/05; B60R 2300/808; B62D 13/06;
(Continued)

(56) References Cited

U.S. PATENT DOCUMENTS

| 4,904,015 A | 2/1990 | Haines |
| 5,183,307 A * | 2/1993 | Chiu, Jr. .................. B60R 9/00 296/99.1 |

(Continued)

FOREIGN PATENT DOCUMENTS

| CN | 101270983 A | 9/2008 |
| CN | 106796729 A | 5/2017 |

(Continued)

OTHER PUBLICATIONS

International Search Report and Written Opinion for International Patent Application No. PCT/EP2019/057448, mailed Nov. 14, 2019, 10 pages.

(Continued)

*Primary Examiner* — Khoi H Tran
*Assistant Examiner* — Tanner L Cullen
(74) *Attorney, Agent, or Firm* — Withrow & Terranova, PLLC

(57) ABSTRACT

A vehicle is provided herein, wherein the vehicle comprises a chassis and a cab mounted to the chassis. A trailer is pivotally connected to the chassis. A camera is arranged on a supporting arm mounted on the cab for providing a captured image of an area located rearward of the cab. A lighting assembly is mounted on the cab and includes at least one light source. The light source is configured to project a picture rearward of the cab forming a mark that is detectable by the camera, and that is representative of an angle between a trailer longitudinal axis and a chassis longitudinal axis. Further, a wind deflecting assembly comprising at least two side deflector panels and the lighting assembly is mounted on the side deflector panels.

11 Claims, 4 Drawing Sheets

(51) Int. Cl.
*B62D 15/02* (2006.01)
*G06V 20/56* (2022.01)
*G06V 30/224* (2022.01)
*B60D 1/62* (2006.01)

(52) U.S. Cl.
CPC ......... *B62D 15/0295* (2013.01); *G06V 20/56* (2022.01); *G06V 30/2247* (2022.01); *B60R 2300/103* (2013.01)

(58) Field of Classification Search
CPC .......... B62D 15/0295; B60W 2720/22; B60W 2520/22; B60Q 1/305
See application file for complete search history.

(56) References Cited

U.S. PATENT DOCUMENTS

| 2008/0180526 | A1 | 7/2008 | Trevino |
| 2008/0310682 | A1* | 12/2008 | Lee ........................... G01S 5/16 |
| | | | 382/106 |
| 2011/0216199 | A1 | 9/2011 | Trevino et al. |
| 2014/0085472 | A1* | 3/2014 | Lu ............................ B60R 1/00 |
| | | | 348/148 |
| 2015/0345939 | A1* | 12/2015 | Salter ...................... F21S 43/26 |
| | | | 356/138 |
| 2016/0023526 | A1* | 1/2016 | Lavoie ................. B62D 15/027 |
| | | | 701/41 |
| 2016/0368336 | A1* | 12/2016 | Kahn .................... B60W 30/06 |
| 2021/0170821 | A1* | 6/2021 | Staudacher .............. B60D 1/64 |

FOREIGN PATENT DOCUMENTS

| CN | 108778784 A | 11/2018 | |
| DE | 102004025252 A1 | 12/2005 | |
| DE | 102016209418 A1 | 11/2017 | |
| EP | 1593552 A1 | 11/2005 | |
| EP | 2949532 A2 | 12/2015 | |
| EP | 2950040 A1 | 12/2015 | |
| JP | 2001334966 A * | 12/2001 | ............. B62D 53/00 |
| JP | 2001334966 A | 12/2001 | |
| WO | WO-2014126511 A1 * | 8/2014 | ........... B60Q 1/0035 |

OTHER PUBLICATIONS

First Office Action for Chinese Patent Application No. 201980090200.1, mailed Jan. 22, 2024, 15 pages.

* cited by examiner

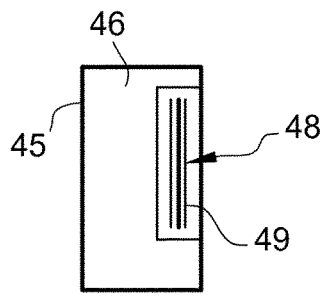
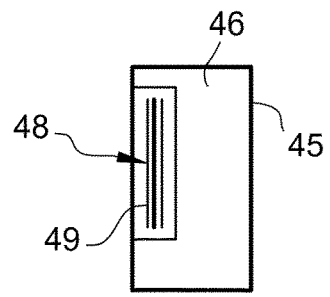
Fig. 3a            Fig. 3b
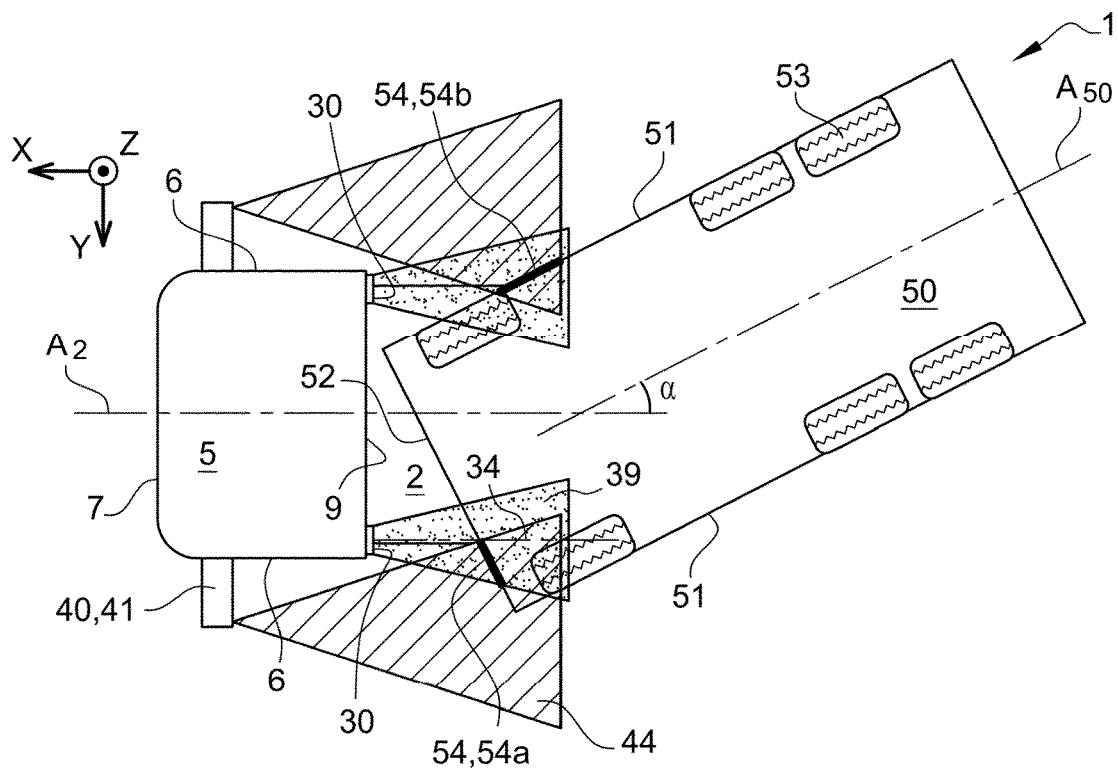
Fig. 4
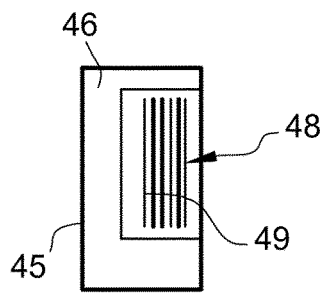
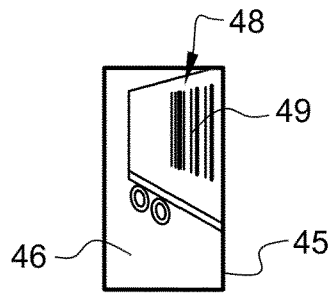
Fig. 5a            Fig. 5b

VEHICLE COMPRISING A TRAILER ANGLE DETERMINING SYSTEM

This application is a 35 USC 371 national phase filing of International Application No. PCT/EP2019/057448, filed Mar. 25, 2019, the disclosure of which is incorporated herein by reference in its entirety.

TECHNICAL FIELD

The invention relates to a vehicle comprising a trailer angle determining system, and to a method for determining an angle between longitudinal axes of a chassis and a trailer of a vehicle.

The invention is used in vehicles including a cab and a trailer that is pivotally connected to the cab, in particular in heavy-duty vehicles, such as trucks.

BACKGROUND

The invention is directed to a vehicle including a cab and a trailer pivotally connected to the cab. When such a vehicle moves straight ahead, the trailer longitudinal axis and the chassis longitudinal axis are substantially coincident; when the vehicle is turning, the trailer longitudinal axis is angled relative to the chassis longitudinal axis.

It is desirable to determine the angle between the longitudinal axes of the chassis and the trailer, for various reasons. In particular, said angle can be an input parameter for calculating other data useful to improve the vehicle operation and/or to assist the driver. For example, determining said angle can be used for trajectory prediction or view adaptation in a camera monitoring system (for instance trailer tracking function).

While systems for determining a vehicle trailer angle exist, they are not fully satisfactory in terms of cost, simplicity and/or accuracy.

SUMMARY

An object of the invention is to improve the determination of a vehicle trailer angle as compared to the prior art.

To that end, according to a first aspect, the invention relates to a vehicle comprising:
- a chassis which has a longitudinal axis and which is supported by wheels;
- a cab mounted on the chassis;
- a trailer pivotally connected to the chassis, the trailer having a longitudinal axis;
- a camera monitoring system which includes a camera arranged on a supporting arm mounted on the cab, for providing a captured image of an area located rearward of the cab;
- at least one lighting assembly mounted on the cab; wherein the lighting assembly includes at least one light source configured to project a picture rearward of the cab, the picture forming a mark on a functional face of the trailer, said mark being detectable by the camera, and being representative of an angle between the trailer longitudinal axis and the chassis longitudinal axis.

In practice, the invention makes use of at least one light source which emits a beam directed rearwards, resulting in a mark being formed on a functional face of the trailer, said functional face being located rearward of the cab. When the vehicle turns, the trailer longitudinal axis becomes angled relative to the chassis longitudinal axis. This results in the functional face of the trailer being moved relative to the cab as compared to the position of this functional face when the trailer longitudinal axis and the chassis longitudinal axis are substantially coincident. Therefore, the picture projected by the light source on the functional face forms different marks on the functional face according to the value of said angle. The camera assembly is capable of detecting and analysing said mark and to deduce the value of said angle.

Owing to the invention, the angle determination does not require any specific marking on the trailer. Indeed, the marks are obtained from the picture projected by the light source(s), meaning that the invention may be easily implemented on any vehicle equipped with a camera monitoring system, irrespective of the trailer external appearance.

The invention makes use of a camera monitoring system, which may be already implemented on the vehicle, and only requires the installation of an additional equipment, namely the lighting assembly. The invention therefore offers a cost-effective solution, which is simple in its structure and in its implementation. The system accuracy may be greatly improved with an appropriate light design and high camera recognition capabilities.

In an embodiment, the at least one light source is configured to project a picture comprising a set of visual elements—such as dots, lines, vertical lines, or curves or similar—and the mark formed on the functional face of the trailer comprises a number of said visual elements. The number of said visual elements typically depends on the angle between the trailer longitudinal axis and the chassis longitudinal axis. Thus, by determining the number of said visual elements, the camera monitoring system allows determining this angle. Providing identical elements and/or regularly spaced elements in a transverse direction can makes the angle determination easier.

Alternatively, or in addition, the angle determination could be achieved through the portion of the picture which is captured by the camera, as the mark. Then, the mark can be a characteristic portion—i.e. recognizable and/or distinguishing portion—of the picture, in contrast to a mark consisting of a number of visual elements.

The at least one light source can comprise several light sources, each light source being configured to project a picture rearward of the cab, said pictures being preferably identical. Alternatively, the at least one light source can comprise a single light source, the lighting assembly further including an optical member for multiplying the picture projected by the single light source. Any of these two embodiments result in the emission of several pictures by the light source(s).

The lighting assembly may further include additional optical elements acting on the beam for modifying some of its parameters such as its path, its convergence, its colour and/or its intensity, such as lenses and reflectors.

The at least one light source may comprise at least one laser, and/or at least one LED.

The at least one light source may have an optical axis which is substantially parallel to the chassis longitudinal axis, or angled relative to the chassis longitudinal axis of an angle lower than 20°, preferably lower than 10°, when projected on a horizontal plane, in use. By "in use" is meant the situation in which the light source is used to determine the trailer angle, i.e. generally when the vehicle is in motion, not when the vehicle is being loaded or unloaded.

The functional face can be at least part of a front face of the trailer, and/or at least part of a side face of the trailer.

In an embodiment, the lighting assembly is mounted on the cab close to the rear edge of the cab. For example, the lighting assembly can be mounted on the cab rear wall, and/or on the cab side wall.

The vehicle preferably comprises one left lighting assembly and one right lighting assembly. Said left and right lighting assemblies can be arranged symmetrically with respect to a longitudinal vertical plane of the cab. Said left and right lighting assemblies can be identical.

The vehicle may further comprise a wind deflecting assembly comprising at least two side deflector panels, each side deflector panel having a front edge linked to a rear portion of a corresponding cab side wall and a rear edge, and extending vertically over at least part of the height of the corresponding cab side wall rear portion, the lighting assembly being mounted on a side deflector panel.

Mounting the lighting assembly on a side deflector panel brings various significant advantages. Being mounted on the side deflector panel, the lighting assembly protrudes relative to the cab outer surface, thereby ensuring a fairly broad area can be reached by the emitted beam, while also being mechanically protected against damages caused by surrounding elements. Furthermore, the position of the side deflector panels is such that substantially no vehicle component is located on the emitted light beam between the light source(s) and the functional face, thereby eliminating the creation of dark areas which would impair the angle determination.

Such an arrangement further allows taking advantage of a component that is present on most vehicles, namely the side deflector panels, which is a cost effective and mechanically simplified solution.

The lighting assembly may further include at least a working lamp configured to illuminate an area located rearward of the cab. Such a working lamp may be required for some operational phases of the vehicle, in particular industrial vehicles such as trucks, typically to make some operations easier and safer for a user. For example, for loading/unloading operations in night or dark conditions, lighting the vehicle aperture through which goods have to be loaded/unloaded may be necessary.

By "working lamp" is meant a lamp comprising one or several light source(s) having a high intensity in the visible spectrum, like a projector. Such a working lamp has a lighting function, not only a signalling function—for example a regulatory function—for informing or warning a person outside the vehicle. The working lamp can be configured to emit a light beam providing at least 2 lux, preferably at least 4 lux, in the target area. In an embodiment, the working lamp can be configured to emit a light beam providing more than 5 lux and less than 10 lux in the target area. The emission level can change depending on the design of the lighting assembly (presence of a reflector or not, number of light sources, emission specifications of light sources, position of light sources, etc.).

The lighting assembly may further include at least one IR emitting light source, such as a LED. This allows improving the camera monitoring system performance in night conditions.

Alternatively, or in addition, the lighting assembly can further include at least one lamp having a signalling function.

According to a second aspect, the invention relates to a method for determining an angle between longitudinal axes of a chassis and a trailer of a vehicle, a cab being mounted on the chassis and the trailer being pivotally connected to the chassis, the vehicle further comprising a camera monitoring system which includes a camera arranged on a supporting arm mounted on the cab, for providing a captured image of an area located rearward of the cab. The method comprises:

a) by means of at least one light source mounted on the cab, projecting a picture rearward of the cab, the picture forming a mark on a functional face of the trailer, the mark being representative of said angle;

b) detecting and analysing the mark by means of the camera monitoring system, in order to determine said angle.

The picture projected by the at least one light source may comprise a set of visual elements such as dots, lines, vertical lines, curves or similar. These elements are preferably identical, and/or preferably regularly spaced in a transverse direction. As a result, the mark formed on the functional face of the trailer comprises a number of said visual elements. Furthermore, step b) of the method may comprise counting the number of visual elements in the mark by means of the camera monitoring system.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 3a and 3b respectively show the image displayed on the left and right monitors based on the image captured by the cameras of the vehicle in the position of FIG. 1;

FIG. 4 is similar to FIG. 1, the trailer of the vehicle being angled relative to the chassis longitudinal axis;

FIGS. 5a and 5b respectively show the image displayed on the left and right monitors based on the image captured by the cameras of the vehicle in the position of FIG. 4;

DETAILED DESCRIPTION OF EXAMPLE EMBODIMENTS OF THE INVENTION

Figure 1:
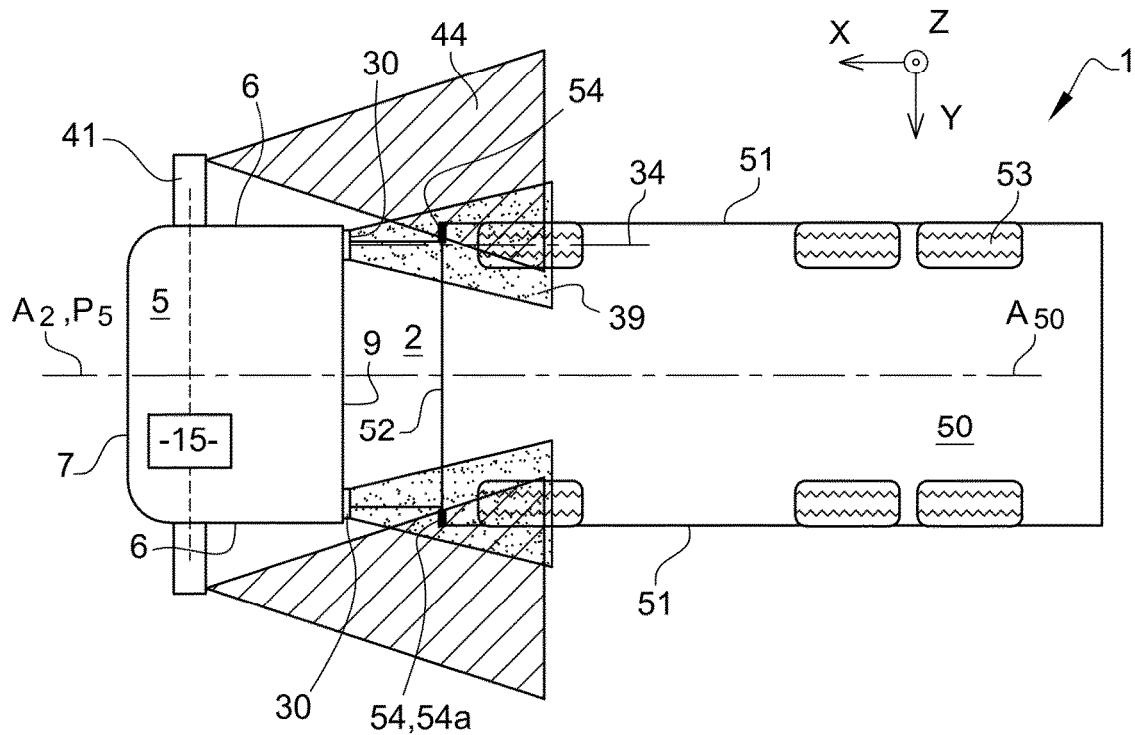
FIG. 1 is a schematic top view of a vehicle according to an embodiment of the invention, the vehicle including a camera monitoring system and a lighting assembly, the trailer of the vehicle being parallel to the chassis longitudinal axis.
Figure 2:
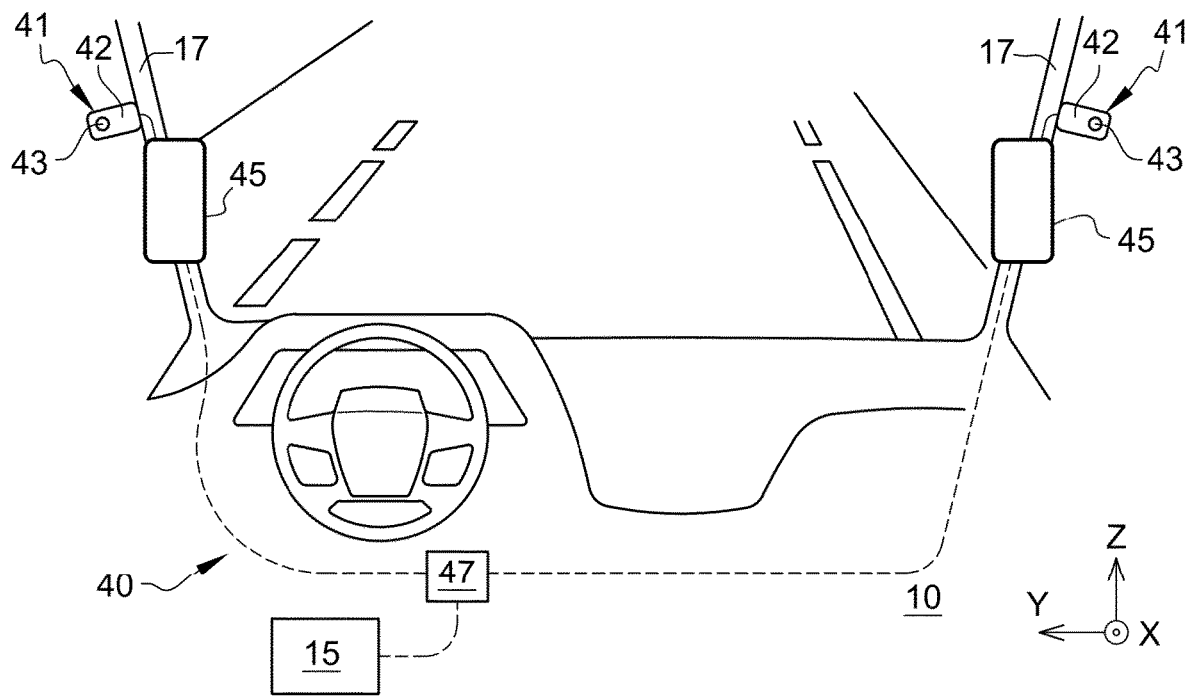
FIG. 2 is a schematic perspective view forward from the interior of the vehicle, showing a left camera assembly and a right camera assembly as well as corresponding monitors for displaying an image based on the image captured by the corresponding camera assembly.
Figure 6:
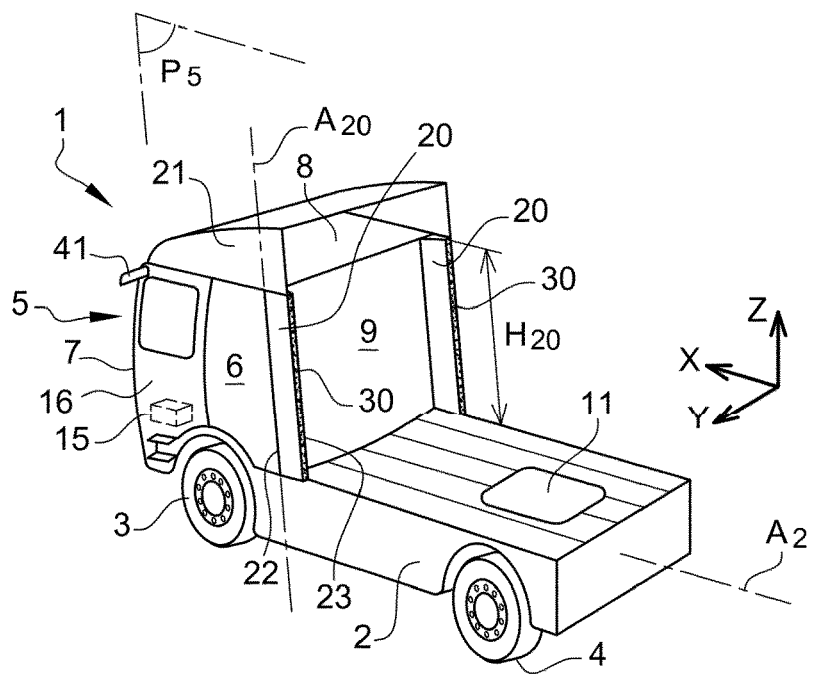
FIG. 6 is a schematic perspective rear view of a vehicle according to another embodiment of the invention, the vehicle including a camera monitoring system and a lighting assembly (the trailer not being illustrated)

As shown in FIGS. 1, 2 and 6, a vehicle 1 comprises a chassis 2 supported by wheels, namely front wheels 3 and rear wheels 4. A cab 5 defining a driver's compartment 10 is mounted on the chassis 2, on the front. The cab 5 has two side walls 6, a front wall 7, a top wall 8 and a rear wall 9.

The chassis 2 can further comprise a trailer connector 11 located rearward of the cab 5. The vehicle 1 can therefore include a trailer 50 mechanically and electrically connected to the chassis 2 (the trailer 50 not being illustrated in FIG. 6). The trailer 50 has side walls 51 and a front wall 52. The trailer 50 further has rear wheels 53.

Z is defined as the vertical direction, X is defined as the longitudinal direction of the vehicle 1, and Y is defined as the transversal direction of the vehicle 1. The chassis 2 has a longitudinal axis A2, and the trailer 50 has a longitudinal axis A50. Besides, the cab 5 has a longitudinal vertical plane P5.

Figure 8:
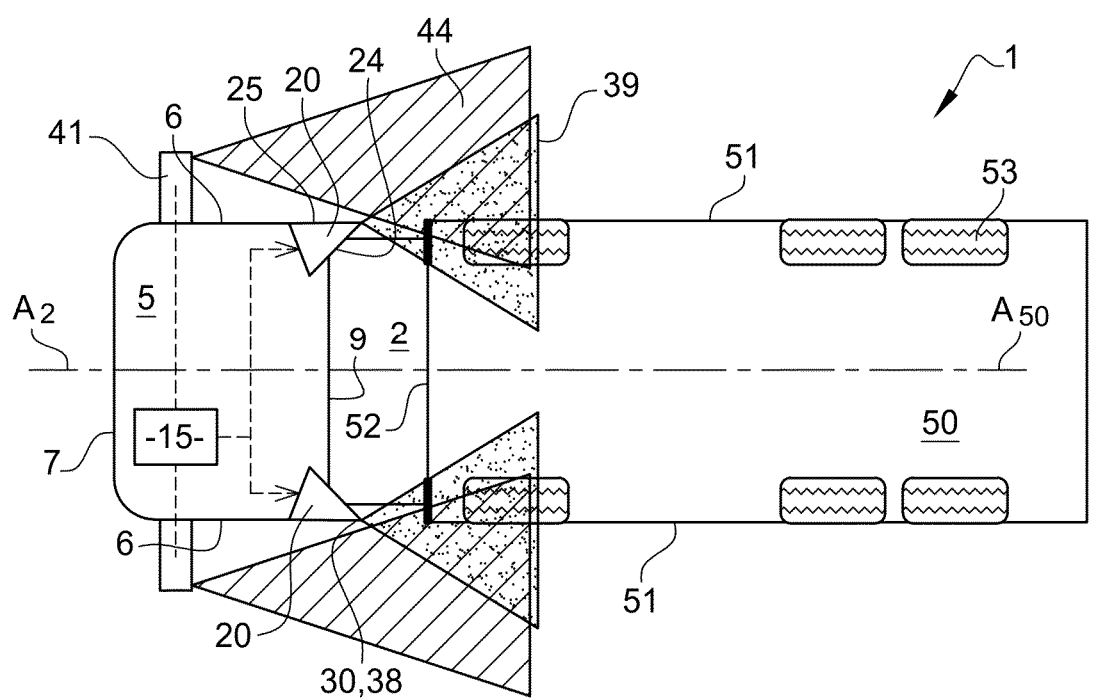
FIG. 8 is a schematic top view of the vehicle of FIG. 6, the trailer of the vehicle being parallel to the chassis longitudinal axis.

The trailer 50 is pivotally connected to the chassis 2. Thus, when the vehicle 1 moves straight ahead, the trailer longitudinal axis A50 and the chassis longitudinal axis A2 are substantially coincident (FIGS. 1 and 8). When the vehicle 1 is turning, the trailer longitudinal axis A50 and the chassis longitudinal axis A2 form an angle α, when projected on a horizontal plane (FIG. 4).

The vehicle 1 may comprise an electrical control unit (ECU) 15 for controlling the various electric systems of the vehicle 1.

The vehicle 1 further includes a camera monitoring system (CMS) 40. The camera monitoring system 40 comprises a camera assembly 41 mounted on the cab 5, preferably one left camera assembly 41 and one right camera assembly 41. The camera assembly 41 can typically be mounted on a front top portion of the corresponding cab side walls 6, for example above a door 16 (see FIG. 6).

Basically, the camera assembly 41 comprises a supporting arm 42 mounted on the cab 5 and a camera 43 arranged on said supporting arm 42, for providing a captured image of an area located rearward of the cab 5, and preferably along the corresponding side of the vehicle 1.

The supporting arm 42 can be fixedly mounted on the cab 5, and can be equipped with a mechanism (not shown) allowing the camera assembly 41 to be:
- either in a parking position (not shown in the figures), when not in use (typically when the vehicle 1 is stopped), in which the camera assembly 41 is folded against the cab side wall 6 to prevent damages;
- or in a use position, in which the camera assembly 41 is protruding from the cab side wall 6, to allow the camera 43 to capture images (FIG. 1 for instance). In this use position, the camera 43 has a field of vision 44.

The camera monitoring system 40 further includes a monitor 45 inside the driver's compartment 10 for displaying an image 46 based on the captured image provided by the camera 43. There may be provided one left monitor 45 and one right monitor 45, respectively connected to the left camera assembly 41 and to the right camera assembly 41. The monitor 45 can be mounted on a front pillar 17 of the cab 5, located between the front wall 7 and one side wall 6.

The camera monitoring system 40 preferably also includes a controller 47, which can be connected to the ECU 15.

The vehicle 1 further comprises at least one lighting assembly 30 which is mounted on the cab 5. The vehicle 1 may typically comprise one left lighting assembly 30 and one right lighting assembly 30 preferably arranged symmetrically with respect to the cab longitudinal vertical plane P5. The left and right lighting assemblies 30 are preferably identical. Each lighting assembly 30 is preferably mounted on the cab 5 close to the corresponding rear edge of the cab 5. For example, as shown in FIG. 1, one lighting assembly 30 can be mounted on the cab rear wall 9, near a side edge of said rear wall 9.

According to the invention, the lighting assembly 30 includes at least one light source 38 configured to project a picture rearward of the cab 5. The picture then forms a mark 48 on a functional face 54 of the trailer 50, said mark 48 or its reflexion being detectable by the camera 43, and being representative of the angle α between the trailer longitudinal axis A50 and the chassis longitudinal axis A2.

Figure 7:
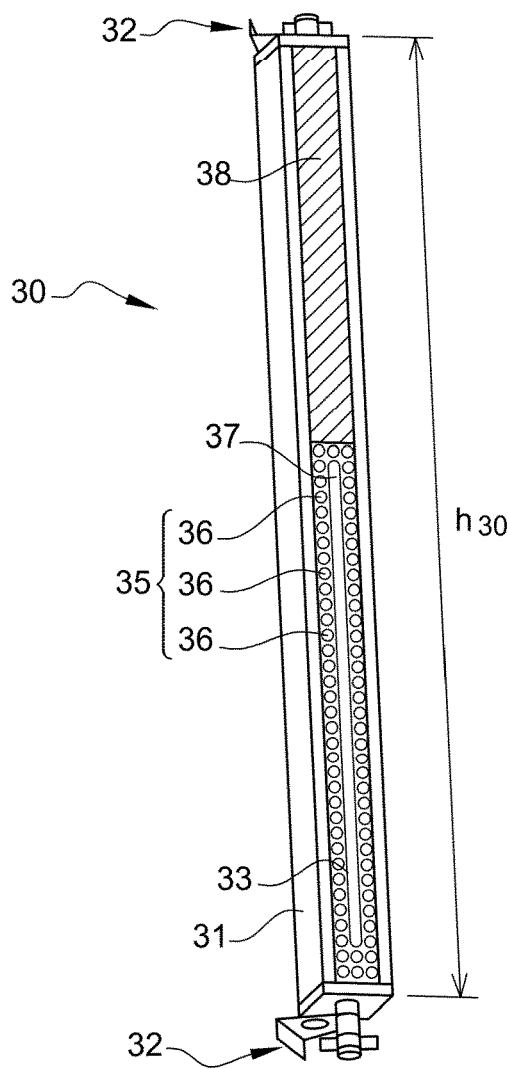
FIG. 7 is a perspective view of a lighting assembly to be mounted on the vehicle.

In practice, as shown in FIG. 7, the lighting assembly 30 may comprise several light sources 38, each light source 38 being configured to project a picture rearward of the cab 5, the pictures preferably being identical. Alternatively, there could be provided a single light source as well as an optical member for multiplying the picture projected by the single light source.

The light source(s) 38 can comprises at least one laser.

As can be seen in FIGS. 1 and 4, the or each light source 38 can be configured to emit a light beam 39. In an embodiment, in use, the or each light source 38 has an optical axis 34 which is substantially parallel to the chassis longitudinal axis A2, or angled relative to the chassis longitudinal axis A2 of an angle lower than 20°, preferably lower than 10°, when projected on a horizontal plane (X,Y).

The light source(s) 38 can be configured to project a picture comprising a set of visual elements such as dots, lines, curves or similar. These elements are preferably identical and regularly spaced in the transverse direction Y. As a consequence, the mark 48 formed on the functional face 54 of the trailer 50 comprises a number of said visual elements 49.

In the illustrated embodiment, as shown in FIGS. 3*a*-*b* and 5*a*-*b*, the visual elements 49 are vertical lines. The mark 48 then consists of a set of vertical lines. However, this should not be considered as limitative.

The functional face 54 can be at least part 54*a* of the front face 52 of the trailer 50. Alternatively or in addition, the functional face 54 can be at least part 54*b* of a side face 51 of the trailer 50. The functional face 54 can be a reflexive surface.

When the trailer longitudinal axis A50 is substantially coincident with the chassis longitudinal axis A2, as shown in FIG. 1, the light sources 38 of the left and right lighting assemblies 30 project pictures on substantially identical lateral areas of the trailer front face 52. Moreover, the field of vision 44 of each camera 43 includes a corresponding small lateral end portion of the trailer front face 52, which corresponds to the functional face 54*a*.

Consequently, the image captured by each camera 43 includes an area located transversally outside the trailer 50, as well as said small lateral end portion of the trailer front face 52. This captured image is processed by the controller 47 of the camera monitoring system 40 and/or by the ECU 15, and this results in an image 46 displayed on the monitor 45 which shows a mark 48 comprising a first number of visual elements 49. As can be seen on FIGS. 3*a* and 3*b*, the images 46 displayed on the left and right monitors 45 are symmetrical relative to plane P5.

When the vehicle 1 is turning, the trailer longitudinal axis A50 becomes angled relative to the chassis longitudinal axis A2, by an angle α. The below explanations will be made with reference to FIG. 4 which shows such a vehicle 1 turning right, bearing in mind that a vehicle turning left would entail symmetrical consequences on the displayed images 46.

Then, the light sources 38 of the left lighting assembly 30 project pictures on an area of the trailer front face 52 which is wider as compared to the straight position of the trailer 50, and further offset inwardly. Besides, the light sources 38 of the right lighting assembly 30 no longer project pictures on the trailer front face 52 (at least above a certain value of angle α), but rather project pictures on part of the trailer right side wall 51.

The field of vision 44 of the left camera 43 includes a lateral end portion of the trailer front face 52 which is wider than in the straight configuration of the vehicle 1. The field of vision 44 of the right camera 43 no longer includes any portion of the trailer front face 52 (at least above a certain value of angle α), but rather a part of the trailer right side wall 51.

The intersection of the light beams 39 of the light source(s) 38 and of the fields of vision 44 of the cameras 43, when projected on the trailer respective front face 52 and side wall 51, form the respective functional faces 54a and 54b, as shown in FIG. 4.

The image captured by the left camera 43 results in the image 46 displayed on the monitor 45 which is illustrated in FIG. 5a. The image 46 comprises an area located transversally outside the trailer 50, as well as a wider lateral end portion of the trailer front face 52 as compared to FIG. 3a. The mark 48 does not appear near the lateral edge of the trailer front face 52. The mark 48 comprises a second number of visual elements 49, which is greater than the first number (with reference to FIG. 3a), and which depends on angle α.

The image captured by the right camera 43 results in the image 46 displayed on the monitor 45 which is illustrated in FIG. 5b. The image 46 comprises an area located transversally outside the trailer 50, as well as a portion of the trailer right side wall 51 on which appears a mark 48 comprising a number of visual elements 49 which depends on angle α.

Thus, the mark 48 is representative of angle α between the longitudinal axes A2, A50 of the chassis 2 and of the trailer 50 of the vehicle 1.

Owing to the detection and analysis of the mark 48 by the corresponding camera monitoring system 40, the invention provides a robust and reliable method for determining said angle α. More specifically, this can be achieved by counting the number of visual elements 49—such as, but not limited to, vertical lines regularly spaced in the transverse direction Y—in the captured image of the mark 48, by means of the camera monitoring system 40.

The accuracy of angle determination depends on the design of said visual elements 49, which should preferably be clearly detectable and differentiated by the cameras 43, and on the definition of the camera sensor element.

Preferably, the colour of the mark 48 and the colour of the trailer operational face 54 should be chosen such that the mark 48 remains visible both in day conditions and night conditions. If necessary, there may be provided one or several elements to improve visibility or contrast, such as: means for changing the colour of the mark (by activating a selected light source having the appropriate colour or located upstream a glass having the appropriate colour), use of a reflector in bright day mode, etc. Possibly, IR light can be used to sense other light frequency and lower disturbance from the environment.

Reference is now made to FIGS. 6 to 8 which show another embodiment of the invention.

In this embodiment, the vehicle 1 further comprises a wind deflecting assembly for improving aerodynamics. The wind deflecting assembly comprises two side deflector panels 20 and can further comprise a top deflector panel 21 arranged on the cab top wall 8.

Each side deflector panel 20 has a front edge 22 linked to a rear portion of the corresponding cab side wall 6 and a rear edge 23, and extends vertically over a height H20 that is at least part of the height of the corresponding cab side wall rear portion. In the exemplary embodiment illustrated in FIG. 1, the height H20 of the side deflector panel 20 is substantially identical to the height of the cab 5. In other embodiments, the side deflector panels 20 could extend further upwards beyond the cab top wall 8. Each side deflector panel 20 has an inner face 24, disposed towards the chassis longitudinal axis 2, and an outer face 25 along which air flows when the vehicle 1 is in motion.

Each side deflector panel 20 may be pivotally mounted relative to the corresponding cab side wall 6, about a pivoting axis A20 which is substantially coincident with the side deflector panel front edge 22. Thus, the side deflector panel 20 may pivot between:

a first position (FIGS. 6 and 8), in which a side deflector panel outer face 25 is substantially flush with the corresponding cab side wall 6. When the vehicle 1 is running, the side deflector panels 20 are preferably in this first position, which is an aerodynamic position;

and a second position (not shown), in which the side deflector panel outer face 25 defines a mean plane which is substantially vertical and angled outwardly from the side deflector panel front edge 22 to the rear edge 23 thereof. As in the second position the side deflector panels protrude outwardly from the cab outer envelope, this second position is preferably not used when the vehicle is running, but rather when the vehicle is stopped, for various operations such as loading/unloading.

As shown in FIG. 2, the lighting assembly 30 can comprise a casing 31 which includes a fastening system 32 for being mounted on the side deflector panel 20 and which has an open rear face. A glass 33 can be mounted on the casing 31 for closing the casing open rear face. The casing 31 and glass 33 thus form a housing which receives light sources that emit a beam rearward through the glass 33. The or some of the light sources can comprise LEDs. The lighting assembly 30 may include other components such as an optical deflector.

As shown in FIG. 6, in this embodiment, the lighting assembly 30 is mounted on a side deflector panel 20. The lighting assembly 30 can be mounted on the inner face 24 of the side deflector panel 20. It can be mounted near the rear edge 23 of the side deflector panel 20.

The lighting assembly 30 has a height h30 that is at least 50%, preferably at least 70% of the side deflector panel height H20. For example, h30 and H20 are substantially identical.

In addition to the light source(s) 38 used to form the marks 48, the lighting assembly 30 may provide other lighting functions. In particular, the lighting assembly 30 may further includes:

at least a working lamp 35 configured to illuminate an area located rearward of the cab 5. The working lamp 35 preferably comprises one or several light source(s) 36 having a high intensity in the visible spectrum;

and/or one or several IR emitting light source(s) 37.

It has to be noted that the arrangement of light sources 36, 37, 38 performing various lighting functions, as illustrated in FIG. 2, is only an exemplary embodiment that should not be considered as limitative.

The invention can further provide a method for operating a lighting assembly in a vehicle, wherein the lighting assembly includes, in addition to light source(s) 38 used to form a camera detectable mark 48 on a functional face located rearward of the cab, at least one additional light source among a working lamp 35 and IR emitting light source(s) 37. The method comprises:

> determining at least one selection parameter among:
> > a configuration of the vehicle 1, such as whether a trailer 50 is connected to the chassis 2 or not;
> > an operating condition of the vehicle 1, such as whether the vehicle 1 is running or stopped, in a trailer loading/unloading phase or not;
> > a surrounding condition, such as the ambient light;
>
> depending on said determined selection parameter, activate automatically or through manual control at least one among: the light source(s) 38 and the at least one additional light source 35, 37.

Then, all light source(s) 36, 37, 38 are not necessarily activated at a given moment, as their functions are different. The invention therefore provides a cost effective solution, insofar as one and the same lighting assembly can perform the appropriate one of several lighting functions.

It is to be understood that the present invention is not limited to the embodiments described above and illustrated in the drawings; rather, the skilled person will recognize that many changes and modifications may be made within the scope of the appended claims.

The invention claimed is:

1. A vehicle comprising:
   a chassis which has a longitudinal axis and which is supported by wheels;
   a cab mounted on the chassis;
   a trailer pivotally connected to the chassis, the trailer having a longitudinal axis;
   a camera monitoring system which includes a camera arranged on a supporting arm mounted on the cab, for providing a captured image of an area located rearward of the cab;
   at least one lighting assembly mounted on the cab, wherein the lighting assembly includes at least one light source configured to project a picture rearward of the cab, the picture forming a mark on a functional face of the trailer, the mark being detectable by the camera, and being representative of an angle between the trailer longitudinal axis and the chassis longitudinal axis; and
   a wind deflecting assembly comprising at least two side deflector panels, each side deflector panel having a front edge linked to a rear portion of a corresponding cab side wall and a rear edge, and extending vertically over at least part of a height of the corresponding cab side wall rear portion, and the lighting assembly being mounted on a side deflector panel.

2. The vehicle of claim 1, wherein the at least one light source is configured to project a picture comprising a set of visual elements, and in that the mark formed on the functional face of the trailer comprises a number of the visual elements.

3. The vehicle of claim 1, wherein the at least one light source comprises at least one of:
   several light sources, each light source being configured to project a picture rearward of the cab; or
   a single light source, the lighting assembly further including an optical member for multiplying the picture projected by the single light source.

4. The vehicle of claim 1, wherein the at least one light source comprises at least one laser.

5. The vehicle of claim 1, wherein the at least one light source has an optical axis that is substantially parallel to the chassis longitudinal axis or angled relative to the chassis longitudinal axis of an angle lower than 20° when projected on a horizontal plane, in use.

6. The vehicle of claim 1, wherein the functional face is at least part of a front face of the trailer.

7. The vehicle of claim 1, wherein the functional face is at least part of a side face of the trailer.

8. The vehicle of claim 1, wherein the lighting assembly is mounted on the cab close to the rear edge of the cab.

9. The vehicle of claim 1, wherein the vehicle comprises one left lighting assembly and one right lighting assembly.

10. The vehicle of claim 1, wherein the lighting assembly further includes at least a working lamp configured to illuminate an area located rearward of the cab.

11. The vehicle of claim 1, wherein the lighting assembly further includes at least one IR emitting light source.

* * * * *